United States Patent
Wang et al.

(10) Patent No.: US 11,575,184 B2
(45) Date of Patent: Feb. 7, 2023

(54) ELECTRONIC EQUIPMENT (71) Applicant: DONGGUAN NVT TECHNOLOGY CO., LTD., Dongguan (CN)

(72) Inventors: Liming Wang, Dongguan (CN); Nini Chen, Dongguan (CN); Guanghui Chen, Dongguan (CN); Xuefeng Liu, Dongguan (CN)

(73) Assignee: DONGGUAN NVT TECHNOLOGY LIMITED, Dongguan (CN)

( * ) Notice: Subject to any disclaimer, the term of this patent is extended or adjusted under 35 U.S.C. 154(b) by 260 days.

(21) Appl. No.: 16/821,503

(22) Filed: Mar. 17, 2020

(65) Prior Publication Data

US 2020/0303714 A1 Sep. 24, 2020

(30) Foreign Application Priority Data

Mar. 18, 2019 (CN) .......................... 201910204670.8

(51) Int. Cl.
*H01M 10/42* (2006.01)
*H01M 50/531* (2021.01)
*H01M 50/543* (2021.01)

(52) U.S. Cl.
CPC ....... *H01M 50/543* (2021.01); *H01M 10/425* (2013.01); *H01M 50/531* (2021.01); *H01M 2010/4271* (2013.01); *H01M 2220/30* (2013.01)

(58) Field of Classification Search
CPC ............. H01M 50/543; H01M 50/531; H01M 10/425; H01M 2010/4271; H01M 2220/30
See application file for complete search history.

(56) References Cited

U.S. PATENT DOCUMENTS

| | | | | |
|---|---|---|---|---|
| 6,316,140 | B1 * | 11/2001 | Hatazawa | H01M 10/0565 429/231.95 |
| 2006/0159990 | A1 * | 7/2006 | Ryu | H01M 50/119 429/181 |
| 2008/0182097 | A1 * | 7/2008 | Mochizuki | C08L 51/06 428/355 EN |
| 2012/0251849 | A1 | 10/2012 | Park | |

(Continued)

FOREIGN PATENT DOCUMENTS

| | | |
|---|---|---|
| CN | 203552132 U | 4/2014 |
| CN | 105897951 A | 8/2016 |
| CN | 106169787 | * 11/2016 |

(Continued)

OTHER PUBLICATIONS

CN 106207285MT (Year: 2016).*

(Continued)

*Primary Examiner* — Alexander Usyatinsky
(74) *Attorney, Agent, or Firm* — Morgan, Lewis & Bockius LLP (57) ABSTRACT

An electronic device includes a cell, a circuit board, and a cell protection unit. The circuit board is provided in the electronic device and configured to control the electronic device. The circuit board is electrically coupled to the cell, and the cell protection unit is provided on the circuit board. The cell protection unit is integrated with the circuit board, so as to facilitate heat dissipation of the cell, prolong the service life of the cell, speed up the production cycle of the cell, and reduce the production cost of the cell.

15 Claims, 4 Drawing Sheets

(56) References Cited

U.S. PATENT DOCUMENTS

2017/0125776 A1*  5/2017  Lee .................... H01M 50/528

FOREIGN PATENT DOCUMENTS

| | | | |
|---|---|---|---|
| CN | 106169787 | A | 11/2016 |
| CN | 106207285 | * | 12/2016 |
| CN | 106207285 | A | 12/2016 |
| CN | 106684829 | A | 5/2017 |
| CN | 108987656 | A | 12/2018 |
| CN | 208422971 | U | 1/2019 |
| CN | 208423037 | U | 1/2019 |
| EP | 1102338 | A1 | 5/2001 |
| EP | 3316384 | * | 2/2018 |
| EP | 3316384 | A1 | 5/2018 |
| EP | 3373382 | A1 | 9/2018 |
| EP | 3579300 | A1 | 12/2019 |

OTHER PUBLICATIONS

CN 106169787 MT (Year: 2016).*
201910204670,Nth_Office_Action_(Translated), dated Mar. 14, 2022 (Year: 2022).*
Office Action, CN201910204670.8, dated Mar. 16, 2021, 9 pgs.
Office Action, CN201910204670.8, dated Sep. 10, 2021, 7 pgs.
Dongguan NVT Technology Co Ltd., Extended European Search Report, EP20163904.4, dated Jul. 27, 2020, 6 pgs.

* cited by examiner

ELECTRONIC EQUIPMENT

CROSS REFERENCE TO THE RELATED APPLICATIONS

This application is based upon and claims priority to Chinese Patent Application No. 201910204670.8, filed on Mar. 18, 2019, the entire contents of which are incorporated herein by reference.

TECHNICAL FIELD

The present disclosure relates to a technical field of communication devices, and more particularly, to an electronic device.

BACKGROUND

Lithium-ion batteries have advantages of high energy density and high reliability, and are widely used in mobile terminals, smart mobile homes, smart aircrafts and other applications. Developing high-capacity lithium batteries has been an area of interest in recent years and will trend in the future, and this trend may also be a new challenge for cell assemblers.

In the related art, most assembly schemes of batteries and electronic terminals include first coupling a cell to a cell protection unit, then encapsulating, and finally transporting the encapsulated battery to a terminal processing factory to be assembled with a main board in a host casing. The above technical schemes have the following defects. The battery encapsulation results in a risk of damaging the cell and causes a safety hazard. The encapsulation extends the battery manufacturing cycle and adds to the time cost. The use of various types of adhesive paper during the encapsulation increases the battery production cost and may weaken heat dissipation during rapid charging. In addition, the encapsulation occupies a certain space and limits the size and capacity of the cell.

SUMMARY

The present disclosure aims to solve at least one of the technical problems existing in the related art. To this end, the present disclosure proposes an electronic device that has advantages of a simple structure and excellent heat dissipation performance.

The electronic device according to an embodiment of the present disclosure includes: a cell; a circuit board configured to control the electronic device, and electrically coupled to the cell; and a cell protection unit provided on the circuit board.

For the electronic device according to the present disclosure, by integrating the cell protection unit with the circuit board, a packaging case for packaging the cell and the cell protection unit in the related art may be omitted, so as to facilitate heat dissipation of the cell, prolong the service life of the cell, speed up the production cycle of the cell, and reduce the production cost of the cell. Meanwhile, the space on the circuit board may be fully utilized to install the cell protection unit, so as to expand the volume of the cell and improve the energy density of the cell; at the same time, the structure of the electronic device becomes more compact and reasonable, which is beneficial to the integrated design of the electronic device.

Preferably, the circuit board includes: a main board configured to control the electronic device and electrically coupled to the cell; and a function board electrically coupled to the main board, the cell protection unit being provided on the main board or the function board.

Preferably, the cell protection unit is provided on the function board, and the cell is electrically coupled to the main board through the function board.

Preferably, the function board is spaced apart from the main board, and the cell is disposed between the main board and the function board.

Preferably, the cell protection unit is electrically coupled to the cell through the circuit board.

Preferably, the cell includes a body and an output terminal, and one end of the output terminal is electrically coupled to the body and an other end of the output terminal is electrically coupled to the circuit board.

Preferably, the output terminal and the circuit board are soldered, riveted, or snapped together.

Preferably, the output terminal is an electrode tab, a flexible circuit board, a metal dome, or a wire.

Preferably, a surface of the output terminal is provided with an adhesive layer.

Preferably, one end of the adhesive layer extends to the body, and an other end of the adhesive layer extends to the circuit board.

Preferably, the adhesive layer is a coating formed by a spray curing process.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and/or other aspects and advantages of the present disclosure will become apparent and can be readily appreciated with help of the following description of embodiments with reference to the drawings, in which.

REFERENCE NUMERALS electronic device 1,
circuit board 10, main board 110, function board 120,
cell 20, output terminal 210, body 220,
cell protection unit 30,
adhesive layer 40.

DETAILED DESCRIPTION

Embodiments of the present disclosure will be described in detail below, and examples of the embodiments will be illustrated with reference to the accompanying drawings. The same or similar reference numerals represent the same or similar elements or the elements having the same or similar functions throughout the description. The embodiments described below with reference to the accompanying drawings are exemplary and used to explain the present disclosure, and cannot be construed to limit the present disclosure.

Various embodiments and examples are provided in the following description to implement different structures of the present disclosure. In order to simplify the present disclosure, components and settings of certain examples will be described. However, these components and settings are only some examples and are not intended to limit the present disclosure. In addition, reference numerals and/or letters may be repeated in different examples of the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

As shown in FIGS. 1-5, an electronic device 1 according to embodiments of the present disclosure includes a cell 20, a circuit board 10, and a cell protection unit 30. The circuit board 10 is provided in the electronic device 1 and is used to control the electronic device 1. It could be understood that the circuit board 10 is coupled to other structural components of the electronic device 1. The term "coupled" herein may refer to structural connection or electrical connection. The circuit board 10 may realize some functions alone, or assist other structural components of the electronic device 1 in implementing some functions. The "functions" mentioned herein may include, but are not limited to, charging, photographing, adjusting sound volume, and adjusting brightness. The circuit board 10 is electrically coupled to the cell 20, the cell protection unit 30 is provided on the circuit board 10, and the cell protection unit 30 is electrically coupled to the cell 20. It could be understood that electrical energy (such as current) flows between the cell 20 and the circuit board 10, and the cell 20 may supply electrical energy to the circuit board 10, the cell protection unit 30 has a structural connection relationship with the circuit board 10, and the cell protection unit 30 may be installed on the circuit board 10.

It should be noted that the "cell protection unit 30" may be an integrated circuit board that can protect the cell 20. The cell protection unit 30 may effectively protect the cell 20 from damage caused by overcharging, over-discharging, overcurrent, short circuits and ultra-high temperature charging and discharging, and enhance the safety and stability of the cell 20. The "circuit board 10" may be an electric module or a conductive module in the electronic device 1. In addition, the "cell 20" mentioned herein is different from a battery in a general sense, and the cell 20 includes an encapsulation film, a cathode electrode sheet, an anode electrode sheet, a separator, and an electrolyte. The separator is interposed between the cathode electrode sheet and the anode electrode sheet. The encapsulation film encapsulates the cathode electrode sheet and the anode electrode sheet. The electrolyte is located in the encapsulation film and filled between the cathode electrode sheet and the anode electrode sheet. Compared with the cell 20, the battery further includes a packaging case for encapsulating the cell 20.

In addition, the term "coupled" mentioned herein shall be understood in a broader sense, and for example, may refer to a fixed connection or a detachable connection; may refer to a direct connection or an indirect connection via intervening structures, may also refer to inner communications or interaction of two elements, which can be understood by those skilled in the art according to specific situations.

For the electronic device 1 according to the embodiments of the present disclosure, by integrating the cell protection unit 30 with the circuit board 10, the packaging case for packaging the cell 20 and the cell protection unit 30 in the related art may be omitted, so as to facilitate heat dissipation of the cell 20, prolong the service life of the cell 20, speed up the production cycle of the cell 20, and reduce the production cost of the cell 20. Meanwhile, the space on the circuit board 10 may be fully utilized to install the cell protection unit 30, such that the volume of the cell 20 may be expanded, the energy density of the cell 20 may be further improved, and at the same time the structure of the electronic device 1 becomes more compact and reasonable, which is beneficial to the integrated design of the electronic device 1.

As shown in FIGS. 1-4, according to some embodiments of the present disclosure, the circuit board 10 includes a main board 110 and a function board 120. The main board 110 is used to control the electronic device 1, and the main board 110 is electrically coupled to the cell 20. The function board 120 is electrically coupled to the main board 110. The cell protection unit 30 is disposed on the main board 110 or the function board 120. In other words, one of the main board 110 or the function board 120 is provided with the cell protection unit 30. It could be understood that electrical energy interacts between the main board 110 and the cell 20, electrical energy interacts between the main board 110 and the function board 120, and electrical energy interacts between the function board 120 and the cell 20. The cell protection unit 30 may be disposed on the main board 110, or the cell protection unit 30 may be disposed on the function board 120.

It should be understood that the "function board 120" herein may be a conductive module having a function of use in the electronic device 1, such as a microphone, a speaker, a headphone jack, a USB interface, or a control board. The "main board 110" may be a control board provided with a resistor, a capacitor or a semiconductor element in the electronic device 1. Therefore, the installation manner of the cell protection unit 30 can be selected according to the spatial arrangement of the electronic device 1, so as to adapt to different space requirements of the electronic device 1.

Figure 3:
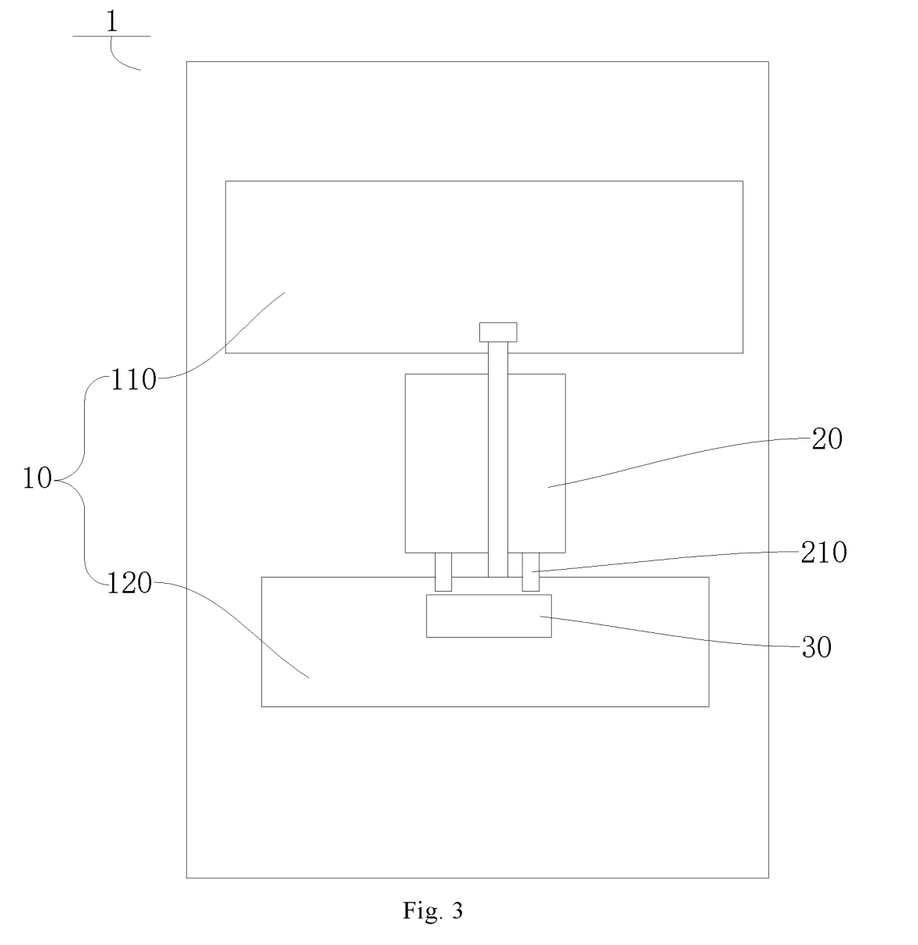
FIG. 3 illustrates a schematic view of an electronic device according to an embodiment of the present disclosure.
Figure 4:
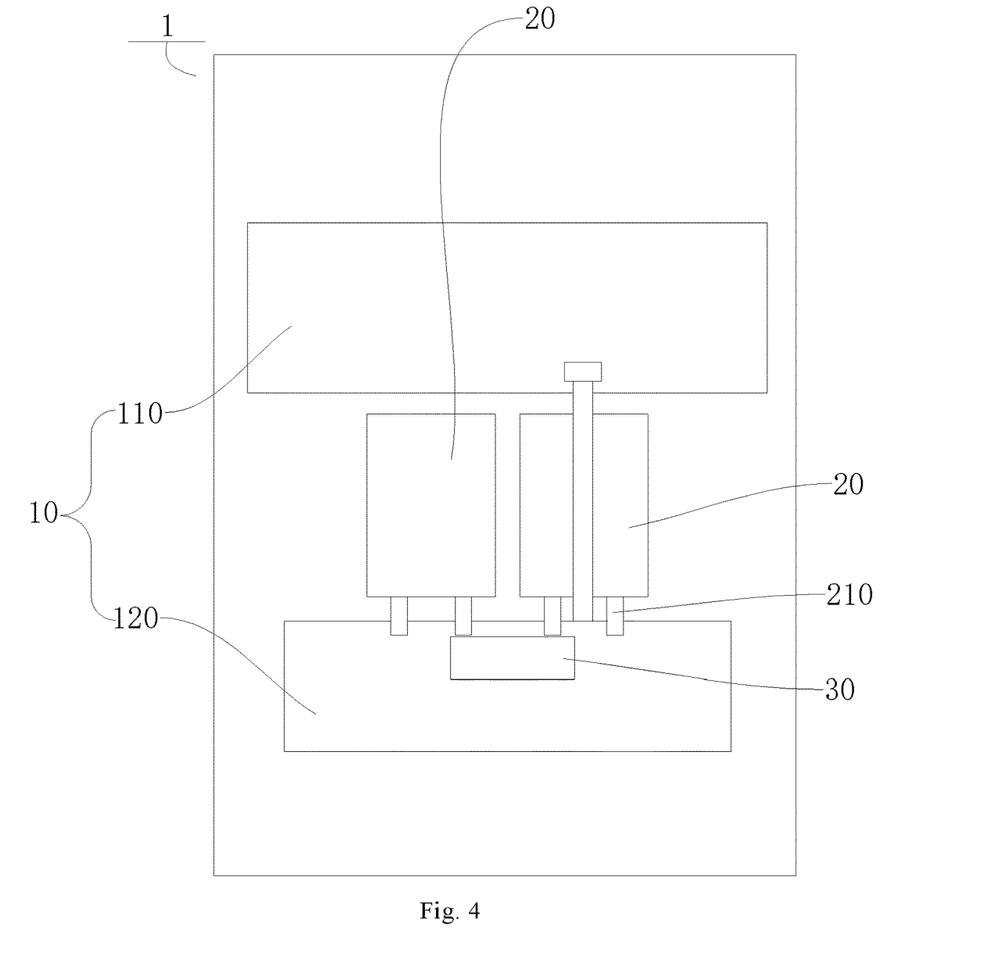
FIG. 4 illustrates schematic view of an electronic device according to an embodiment of the present disclosure.

As shown in FIGS. 3 and 4, in some embodiments of the present disclosure, the cell protection unit 30 is disposed on the function board 120, and the cell 20 is electrically coupled to the main board 110 through the function board 120. It could be understood that the cell 20 may be electrically coupled to the function board 120, the function board 120 is electrically coupled to the main board 110, and electrical energy of the cell 20 may be transferred to the main board 110 through the function board 120. Thus, the setting for electrical connection between the cell 20 and the main board 110 may be omitted, and the electrical connection among the cell 20, the function board 120, and the main board 110 may be simplified.

As shown in FIGS. 1-4, in some embodiments of the present disclosure, the function board 120 and the main board 110 are spaced apart, and the cell 20 is disposed between the main board 110 and the function board 120. For example, the function board 120 may be located at one end of the cell 20 in a length direction, and the main board 110 may be located at the other end of the cell 20 in the length direction. Thus, the arrangement and setting for the connection among the cell 20, the function board 120, and the main board 110 may be facilitated, and such an arrangement also satisfies the space requirements in the electronic device 1. Moreover, by spacing the main board 110 apart from the function board 120, the heat dissipation of the main board 110 and the function board 120 may be facilitated, so as to improve the heat dissipation performance of the electronic device 1.

As shown in FIGS. 1-4, according to some embodiments of the present disclosure, the cell protection unit 30 is electrically coupled to the cell 20 through the circuit board 10. It could be understood that the cell protection unit 30 is electrically coupled to the circuit board 10, and the circuit board 10 is electrically coupled to the cell 20. An electrical signal emitted by the cell protection unit 30 may be transmitted to the cell 20 through the circuit board 10, and an electrical signal emitted by 20 may be transmitted to the cell protection unit 30 via the circuit board 10. Thus, the setting for the electrical connection between the cell protection unit 30 and the cell 20 may be omitted, and the assembly of the electronic device 1 may be simplified.

Figure 5:
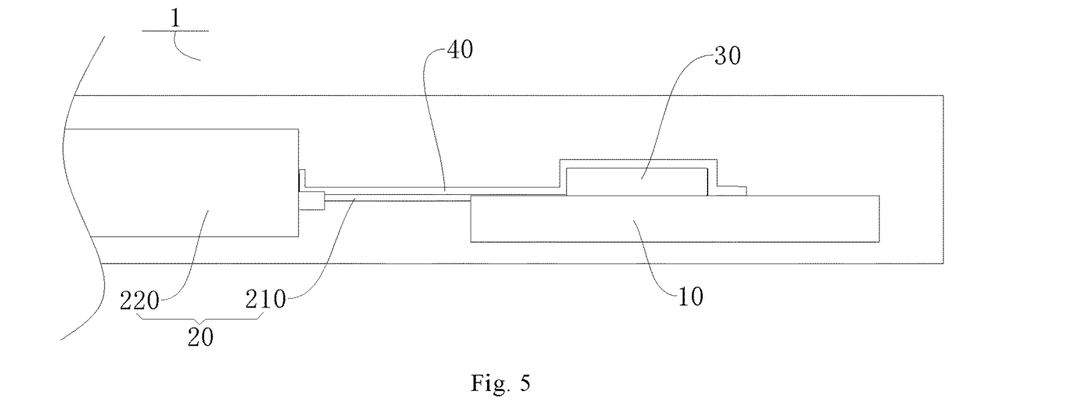
FIG. 5 illustrates a partial schematic view of an electronic device according to an embodiment of the present disclosure.

As shown in FIG. 5, according to some embodiments of the present disclosure, the cell 20 includes a body 220 and an output terminal 210. One end of the output terminal 210 is electrically coupled to the body 220, and the other end of the output terminal 210 is electrically coupled to the circuit board 10. The "body 220" may include a cathode electrode sheet, an anode electrode sheet, and a separator. Thus, the electrical connection between the cell 20 and the circuit board 10 may be facilitated.

In some embodiments of the present disclosure, the output terminal 210 and the circuit board 10 are soldered, riveted, or snapped together. The soldering process is relatively simple. Soldering the output terminal 210 and the circuit board 10 can not only realize the electrical connection between the output terminal 210 and the circuit board 10, but also realize the structural connection between the output terminal 210 and the circuit board 10. Both riveting and snapping processes have detachable characteristics, so as to facilitate the connection and detachment of the output terminal 210 and the circuit board 10. For example, the circuit board 10 may be provided with a first connector, and the output terminal 210 may be provided with a second connector adapted to the first connector. The first connector and the second connector can be plugged together.

Figure 1:
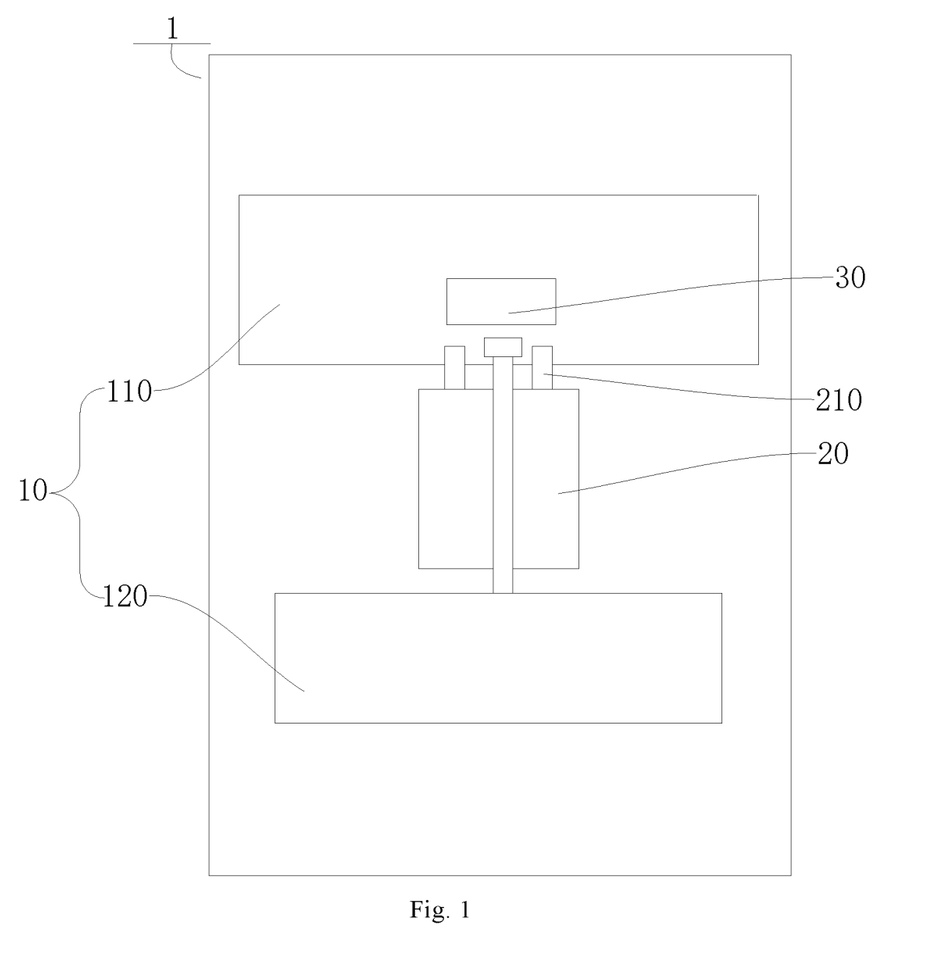
FIG. 1 illustrates a schematic view of an electronic device according to an embodiment of the present disclosure.
Figure 2:
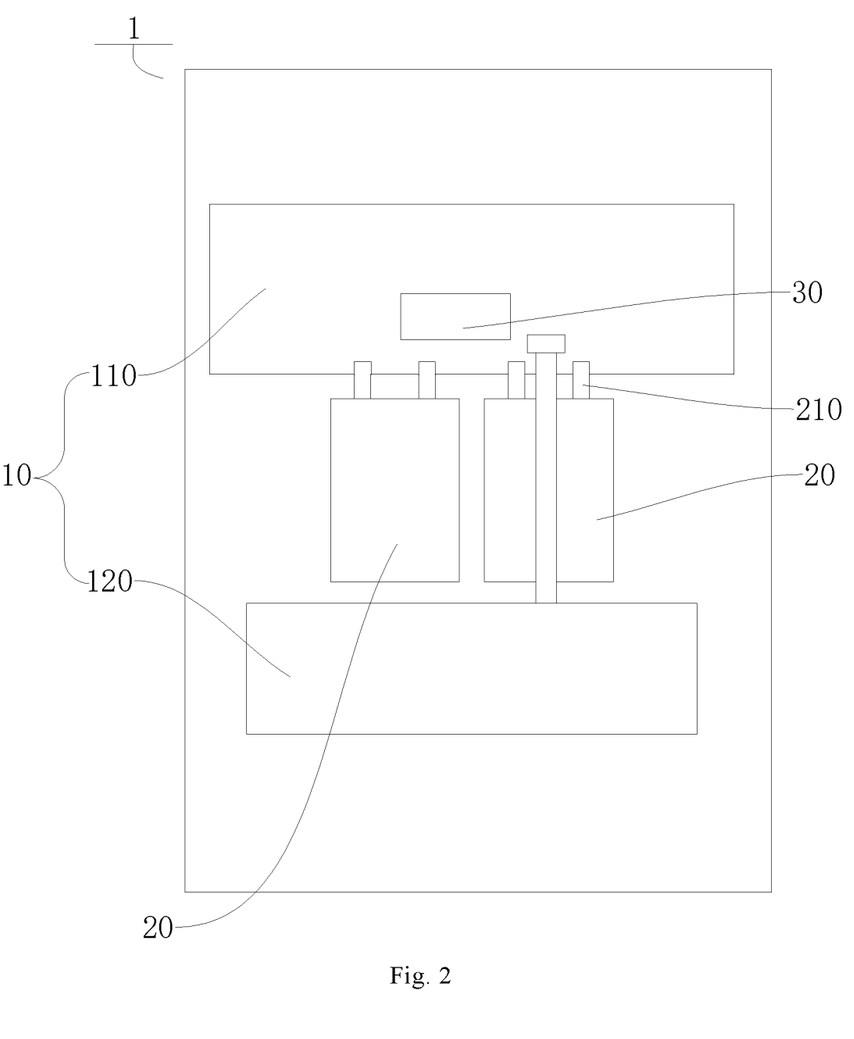
FIG. 2 illustrates a schematic view of an electronic device according to an embodiment of the present disclosure.

In some embodiments of the present disclosure, the output terminal 210 is an electrode tab, a flexible circuit board, a metal dome, or a wire. Thus, the arrangement and construction of the output terminal 210 may be simplified. In some embodiments of the present disclosure, as shown in FIGS. 1-4, the cell 20 is electrically coupled to the circuit board 10 through an electrode tab. Thus, the connection wiring between the cell 20 and the circuit board 10 is simplified, and the structure of the electronic device 1 becomes more compact and reasonable. As shown in FIGS. 1 and 2, each cell 20 is provided with a positive electrode tab and a negative electrode tab, and the circuit board 10 is directly electrically coupled to both the positive electrode tab and the negative electrode tab of the cell 20.

In some embodiments of the present disclosure, the cell 20 is electrically coupled to the circuit board 10 through a flexible circuit board. It should be noted that the flexible circuit board has good flexibility, and since the circuit board 10 and the cell 20 are electrically coupled through the flexible circuit board, the layout and design of the flexible circuit board may be facilitated, the production efficiency of the electronic device 1 may be improved, and the production cost of the electronic device 1 may be lowered.

In some embodiments of the present disclosure, the cell 20 may be electrically coupled to the circuit board 10 through a metal dome. Thus, the connection structure between the cell 20 and the circuit board 10 is simplified. Moreover, the metal dome has a simple structure and is easy to process, which reduces the production cost of the electronic device 1. In addition, the metal dome is used for the electrical connection between the cell 20 and the circuit board 10, which enhances the stability and reliability of the electrical connection between the cell 20 and the circuit board 10.

In some embodiments of the present disclosure, the cell 20 is electrically coupled to the circuit board 10 through a wire. It should be noted that the cell 20 and the circuit board 10 are connected by the wire, which facilitates the internal wiring and the layout of other electronic components of the electronic device 1 (such as motors, cameras, etc.).

As shown in FIG. 5, in some embodiments of the present disclosure, a surface of the output terminal 210 is provided with an adhesive layer 40. For example, when the output terminal 210 is an electrode tab, an edge of the electrode tab is usually formed with burrs, and the burrs easily pierce the separator of the cell 20 and result in contact between the cathode electrode sheet and the anode electrode sheet of the cell 20, thereby causing the cell 20 to be short-circuited. By providing the adhesive layer 40, the adhesive layer 40 shields the burrs, so that a risk of the short circuit in the cell 20 may be avoided, and the safety performance of the electronic device 1 is improved. For example, one side of the output terminal 210 is coupled to the circuit board 10, and the other side of the output terminal 210 is provided with the adhesive layer 40.

In some embodiments of the present disclosure, the adhesive layer 40 is a coating formed by a spray curing process. It could be understood that the adhesive layer 40 may be a coating formed by spraying. Thus, the arrangement of the adhesive layer 40 may be facilitated, and the distribution uniformity of the adhesive layer 40 may be improved.

In some embodiments of the present disclosure, the adhesive layer 40 is an insulating adhesive layer. It could be understood that the adhesive layer 40 is not conductive and the adhesive layer 40 is an insulating member. Thus, the safety performance of the electronic device 1 may be improved. In some embodiments of the present disclosure, the adhesive layer 40 is an adhesive paper or glue. The adhesive paper and glue are commonly used adhesive materials in life, and using the adhesive paper or glue to form the adhesive layer 40 can not only reduce the cost of the adhesive layer 40, but also facilitate the arrangement of the adhesive layer 40 to improve the arrangement efficiency of the adhesive layer 40. As shown in FIG. 5, in some embodiments of the present disclosure, one end of the adhesive layer 40 extends to the body 220, and the other end of the adhesive layer 40 extends to the circuit board 10. Thus, the action range of the adhesive layer 40 gets expanded, and the safety performance of the cell 20 is further guaranteed.

As shown in FIGS. 2 and 4, according to some embodiments of the present disclosure, a plurality of cells 20 are provided and spaced apart from each other. It could be understood that by providing the plurality of cells 20, the total electric capacity of the electronic device 1 may be increased, and the standby time and operation time of the electronic device 1 may be prolonged. Moreover, the plurality of cells 20 are spaced apart, which facilitates the heat dissipation of the cells 20, so as to improve the user experience of the electronic device 1. For example, two cells 20 may be provided and spaced apart. The two cells 20 may be spaced apart along a width direction of the electronic device 1. It could be understood that the number and arrangement of the cells 20 are not limited to the above settings. In practical production, the number of cells 20 and the arrangement of cells 20 may be selected and designed according to actual needs. The electronic device 1 according to the embodiments of the present disclosure will be described in detail below with reference to FIGS. 1 to 5. It should be understood that the following description is merely exemplary rather than restrictive to the present disclosure.

First Embodiment

As shown in FIG. 1, the electronic device 1 in this embodiment includes: a main board 110, a cell 20, a cell protection unit 30, and a function board 120.

The main board 110 and the function board 120 are spaced apart along a length direction of the electronic device 1, and the cell 20 is disposed between the main board 110 and the function board 120. The cell 20 of the electronic device 1 is not packaged. As shown in FIG. 1, the cell protection unit 30 is integrated on the main board 110, that is, the cell protection unit 30 and the main board 110 form an integral structure. As shown in FIG. 5, an electrode tab of the cell 20 is soldered to the main board 110, and a surface of the electrode tab of the cell 20 is provided with an adhesive layer 40. One end of the adhesive layer 40 extends to a surface of the cell 20, and the other end of the adhesive layer 40 extends onto the main board 110. The adhesive layer 40 may cover the cell protection unit 30. The function board 120 is electrically coupled to the cell 20 through a flexible circuit board.

Thus, by designing the cell protection unit 30 on the main board 110, the occupied space of the cell 20 may be saved, the available space of the cell 20 may be increased, and the capacity and endurance of the cell 20 may be improved. In addition, the cell 20 does not need to be packaged (including various types of adhesive paper), so that the materials required for the packaging of the cell 20 may be saved, and the production cycle and cost of the cell 20 may be reduced. Moreover, the rise in temperature during charging of the cell 20 may be improved to a certain extent, the use experience of the cell 20 may be optimized, and the production cycle of the cell 20 may be shortened.

Second Embodiment

As shown in FIG. 2, unlike the first embodiment, two cells 20 are provided in this embodiment. The two cells 20 are spaced apart along a width direction of the electronic device 1, and the two cells 20 are coupled in series. As a result, the electric capacity of the electronic device 1 may be increased, so that the standby time and operation time of the electronic device 1 may be prolonged.

Third Embodiment

As shown in FIG. 3, the electronic device 1 in this embodiment includes: a main board 110, a cell 20, a cell protection unit 30, and a function board 120.

The main board 110 and the function board 120 are spaced apart along a length direction of the electronic device 1, and the cell 20 is disposed between the main board 110 and the function board 120. The cell 20 of the electronic device 1 is not packaged. As shown in FIG. 3, the cell protection unit 30 is integrated on the function board 120, that is, the cell protection unit 30 and the function board 120 form an integral structure. As shown in FIG. 5, an electrode tab of the cell 20 is soldered to the function board 120, and a surface of the electrode tab of the cell 20 is provided with an adhesive layer 40. One end of the adhesive layer 40 extends to a surface of the cell 20, and the other end of the adhesive layer 40 extends onto the function board 120. The adhesive layer 40 may cover the cell protection unit 30. The main board 110 is electrically coupled to the function board 120 through a flexible circuit board.

Thus, by integrating the cell protection unit 30 with the function board 120, the occupied space of the cell may be saved, the space available for the cell 20 may be increased, and the capacity and endurance of the cell 20 may be improved. In addition, the cell 20 does not need to be packaged (including various types of adhesive paper), so that the materials required for the packaging of the cell 20 may be saved, and the production cycle and cost of the cell 20 may be reduced. Moreover, the rise in temperature during charging of the cell 20 may be improved to a certain extent, the use experience of the cell 20 may be optimized, and the production cycle of the cell 20 may be shortened.

Fourth Embodiment

As shown in FIG. 4, unlike the third embodiment, two cells 20 are provided in this embodiment. The two cells 20 are spaced apart along a width direction of the electronic device 1, and the two cells 20 are coupled in series. As a result, the electric capacity of the electronic device 1 may be increased, so that the standby time and operating time of the electronic device 1 may be prolonged.

In the description of the present disclosure, it should be understood that terms such as "central," "longitudinal," "transverse," "length," "width," "thickness," "up," "down," "front," "rear," "left," "right," "vertical," "horizontal," "top," "bottom," "inner," "outer," "clockwise," "counter-clockwise," "axial," "radial," "circumferential" and the like should be construed to refer to the orientation as then described or as shown in the drawings under discussion. These terms are for convenience and simplification of description and do not indicate or imply that the device or element referred to must have a particular orientation, or be constructed and operated in a particular orientation. Thus, these terms shall not be construed to limit the present disclosure.

In addition, terms such as "first" and "second" are used herein for purposes of description and are not intended to indicate or imply relative importance or significance or to imply the number of indicated technical features. Thus, the feature defined with terms "first" and "second" may explicitly or implicitly comprise one or more of the same feature. In the description of the present disclosure, the term "a plurality of" means two or more than two, unless specified otherwise.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is perpendicularly or obliquely "on," "above," or "on top of" the second feature, or just means that the first feature is at a height higher than that of the second feature; while a first feature "below," "under," or "on bottom of" a second feature may include an embodiment in which the first feature is perpendicularly or obliquely "below," "under," or "on bottom of" the second feature, or just means that the first feature is at a height lower than that of the second feature.

Reference throughout this specification to terms "one embodiment," "some embodiments," "an example," "a specific example," or "some examples" means that a particular feature, structure, material, or characteristic described in connection with the embodiment or example is included in at least one embodiment or example of the present disclosure. In this specification, the appearances of the aforesaid terms are not necessarily referring to the same embodiment or example. Moreover, the particular features, structures, materials, or characteristics described can be combined in any suitable manner in one or more embodiments or examples. In addition, those skilled in the art may combine and incorporate different embodiments or examples as well as features of different embodiments or examples described in the present disclosure, on the premise of no contradiction.

Although embodiments of the present disclosure have been illustrated and described above, it should be understood by those skilled in the art that changes, modifications, alternatives, and variations can be made in the embodiments without departing from principles and purposes of the present disclosure. The scope of this disclosure is defined by the claims and their equivalents.

What is claimed is:

1. An electronic device, comprising:
a package case-free cell;
a circuit board configured to control the electronic device, and the circuit board electrically coupled to the package case-free cell via an output terminal of the package case-free cell; and
a cell protection unit provided on the circuit board,
wherein the circuit board comprises a main board configured to control the electronic device and electrically coupled to the package case-free cell, a function board electrically coupled to the main board;
wherein, the cell protection unit is integrated with the function board, the function board is spaced apart from the main board and the package case-free cell is disposed between the main board and the function board; and
wherein an adhesive layer is provided to cover a front surface of a body of the package case-free cell, a side surface of the output terminal of the package case-free cell and a main surface of the cell protection unit.

2. The electronic device according to claim 1, wherein the package case-free cell is electrically coupled to the main board through the function board.

3. The electronic device according to claim 1, wherein the cell protection unit is electrically coupled to the package case-free cell through the circuit board.

4. The electronic device according to claim 1, wherein the output terminal and the circuit board are soldered, riveted, or snapped together.

5. The electronic device according to claim 1, wherein the output terminal is an electrode tab, a flexible circuit board, a metal dome, or a wire.

6. The electronic device according to claim 1, wherein one end of the adhesive layer extends to the body of the package case-free cell, and another end of the adhesive layer extends to the function board.

7. The electronic device according to claim 1, wherein the adhesive layer is a coating formed by a spray curing process.

8. An electronic device, comprising:
a main board;
a function board spaced apart from the main board in a length direction of the electronic device;
a package case-free cell provided between the main board and the function board and electrically coupled to the function board via an output terminal of the package case-free cell;
a cell protection unit integrated with the main board; and
an adhesive layer provided on the package case-free cell and configured to cover a front surface of a body of the package case-free cell, a side surface of the output terminal of the package case-free cell and a main surface of the cell protection unit.

9. The electronic device according to claim 8, wherein a plurality of package case-free cells spaced apart from each other are provided between the main board and the function board.

10. The electronic device according to claim 9, wherein the plurality of package case-free cells are coupled in series.

11. The electronic device according to claim 8, wherein the adhesive layer is an insulating adhesive layer.

12. An electronic device, comprising:
a main board;
a function board spaced apart from the main board in a length direction of the electronic device;
a package case-free cell provided between the main board and the function board and electrically coupled to the function board via an output terminal of the package case-free cell;
a cell protection unit integrated with the function board; and
an adhesive layer provided to the package case-free cell and configured to cover a front surface of a body of the package case-free cell, a side surface of the output terminal of the package case-free cell and a main surface of the cell protection unit.

13. The electronic device according to claim 12, wherein a plurality of package case-free cells spaced apart from each other are provided between the main board and the function board.

14. The electronic device according to claim 13, wherein the plurality of package case-free cells are coupled in series.

15. The electronic device according to claim 12, wherein the adhesive layer is an insulating adhesive layer.

* * * * *